US011194822B2

(12) United States Patent
Peng (10) Patent No.: US 11,194,822 B2
(45) Date of Patent: Dec. 7, 2021

(54) SEARCH RANKING METHOD AND APPARATUS, ELECTRONIC DEVICE AND STORAGE MEDIUM

(71) Applicant: Tianjin Bytedance Technology Co., Ltd., Tianjin (CN)

(72) Inventor: Zhao Peng, Beijing (CN)

(73) Assignee: TIANJIN BYTEDANCE TECHNOLOGY CO., LTD., Tianjin (CN)

(*) Notice: Subject to any disclaimer, the term of this patent is extended or adjusted under 35 U.S.C. 154(b) by 0 days.

(21) Appl. No.: 16/760,437

(22) PCT Filed: Nov. 1, 2018

(86) PCT No.: PCT/CN2018/113418
§ 371 (c)(1),
(2) Date: Apr. 29, 2020

(87) PCT Pub. No.: WO2020/019563
PCT Pub. Date: Jan. 30, 2020

(65) Prior Publication Data
US 2020/0356572 A1 Nov. 12, 2020

(30) Foreign Application Priority Data
Jul. 27, 2018 (CN) .......................... 201810848395.9

(51) Int. Cl.
*G06F 16/2457* (2019.01)
(52) U.S. Cl.
CPC .............................. *G06F 16/24578* (2019.01)

(58) Field of Classification Search
CPC .... G06F 16/24578; H04L 51/32; G06Q 50/01
See application file for complete search history.

(56) References Cited

U.S. PATENT DOCUMENTS

2016/0124958 A1* 5/2016 Sinha .................. G06F 16/9535
707/733

FOREIGN PATENT DOCUMENTS

CN 101739418 A 6/2010
CN 101986306 A 3/2011
(Continued)

OTHER PUBLICATIONS

International Patent Application No. PCT/CN2018/113418; Int'l Search Report; dated Apr. 30, 2019; 2 pages.

*Primary Examiner* — Hau H Hoang
(74) *Attorney, Agent, or Firm* — BakerHostetler (57) ABSTRACT

The present application relates to a search ranking method, a search ranking apparatus, an electronic device and a storage medium. In an embodiment of the method, acquiring search keywords and determining a plurality of initial search results that match with the plurality of keywords; extracting text similarity, update time dimension, and objective importance of contacts according to the initial search results; acquiring a weight of the text similarity, a weight of the update time dimension, and a weight of the objective importance of the contacts; performing a fusion calculation on each of the initial search results to obtain a comprehensive weight of each of the initial search results; and ranking the plurality of initial search results according to the comprehensive weights. The method enables the user to quickly find relevant information, simplifies the operation, and improves the searching efficiency.

20 Claims, 6 Drawing Sheets

(56) References Cited

FOREIGN PATENT DOCUMENTS

| | | |
|---|---|---|
| CN | 102426610 A | 4/2012 |
| CN | 102436510 A | 5/2012 |
| CN | 102508918 A | 6/2012 |
| CN | 102739869 A | 10/2012 |
| CN | 102890696 A | 1/2013 |
| CN | 102955813 A | 3/2013 |
| CN | 103257982 A | 8/2013 |
| CN | 104077407 A | 10/2014 |
| CN | 104182488 A | 12/2014 |
| CN | 105653661 A | 6/2016 |
| CN | 106649647 A | 5/2017 |
| CN | 107766537 A | 3/2018 |
| CN | 108304407 A | 7/2018 |

* cited by examiner

SEARCH RANKING METHOD AND APPARATUS, ELECTRONIC DEVICE AND STORAGE MEDIUM

CROSS-REFERENCE TO RELATED APPLICATIONS

The present application is the national phase application of International Patent Application No. PCT/CN2018/113418, titled "Search Ranking Method and Apparatus, Electronic Device and Storage Medium", filed on Nov. 1, 2018, which claims priority to Chinese patent application No. 201810848395.9, titled "Search Ranking Method and Apparatus, Computer Device and Storage Medium", filed by the applicant "Tianjin ByteDance Technology Co., Ltd" on Jul. 27, 2018 with the Chinese Patent Office, both of which are incorporated herein by reference in their entities.

FIELD OF THE INVENTION

The present application relates to the technical field of enterprise instant messaging systems, and in particular to a search ranking method, a search ranking apparatus, an electronic device and a storage medium.

BACKGROUND OF THE INVENTION

With the rapid development of smart devices, more and more chat applications have emerged, and the use of chat applications enables users far away from each other to communicate. The chat applications include personal chat applications and enterprise chat applications. During the use of the enterprise chat applications, when the user needs to search for relevant information, a search function is activated, such as searching for chat information, contacts or group chats, so that the relevant information can be quickly found or a chat link can be quickly established.

At present, the following problem exists when the search function of the enterprise chat application is implemented: search results of the enterprise chat application are displayed separately according to different objects, wherein information such as contacts, group chats, messages and the like are displayed in separate columns; moreover, the displayed objects are ranked in a chronological order, and the user searches for relevant information according to the displayed columns, making the operation cumbersome and time consuming.

SUMMARY OF THE INVENTION

On this basis, it is necessary to provide a search ranking method, a search ranking apparatus, an electronic device, and a storage medium that are capable of reflecting public evaluation data in view of the above technical problems.

A search ranking method is provided, which includes:

acquiring search keywords and determining a plurality of initial search results that match with the plurality of keywords;

extracting text similarity, update time dimension, and objective importance of contacts according to the initial search results;

acquiring a weight of the text similarity, a weight of the update time dimension, and a weight of the objective importance of the contacts according to the text similarity, the update time dimension, and the objective importance of the contacts;

performing a fusion calculation on each of the initial search results according to the weight of the text similarity, the weight of the update time dimension, and the weight of the objective importance of the contacts to obtain a comprehensive weight of each of the initial search results; and ranking the plurality of initial search results according to the comprehensive weights.

A search ranking apparatus is provided, which includes:

an initial search result extraction module, configured to acquire search keywords and determine a plurality of initial search results that match with the plurality of keywords;

a characteristic factor extraction module, configured to extract text similarity, update time dimension, and objective importance of contacts associated with each of the initial search results;

a weight calculation module, configured to acquire a weight of the text similarity, a weight of the update time dimension, and a weight of the objective importance of the contacts according to the text similarity, the update time dimension, and the objective importance of the contacts;

a comprehensive weight calculation module, configured to perform a fusion calculation according to the weight of the text similarity, the weight of the update time dimension, and the weight of the objective importance of the contacts to obtain a comprehensive weight of each of the initial search results; and a ranking module, configured to rank the plurality of initial search results according to the comprehensive weights.

An electronic device is provided, which includes a memory having a computer program stored thereon, and a processor, wherein when the computer program is executed by the processor, steps of the above search ranking method are implemented.

A computer readable storage medium is provided, which has a computer program stored thereon, wherein when the computer program is executed by a processor, steps of the above search ranking method are implemented.

The above-mentioned search ranking method, search ranking apparatus, electronic device and storage medium ensure that the ranking is performed according to time by acquiring the weight of the update time dimension, and the ranking is recommended according to the objective importance of the contacts, so that the search results with high public evaluation data are ranked ahead; by ranking the search results according to a plurality of dimensions, the ranking is made intelligent, which facilitates users in quickly finding relevant information, simplifies the operation, and improves the searching efficiency.

BRIEF DESCRIPTION OF THE DRAWINGS

In order to illustrate the technical solutions in the embodiments of the present application more clearly, one or more embodiments will be illustratively described below with reference to the figures in the corresponding accompanying drawings, and the illustrative description should not be construed as limiting the embodiments, wherein.

DETAILED DESCRIPTION OF THE EMBODIMENT(S) OF THE INVENTION

In order to make the objects, technical solutions and advantages of the present application more clearly understood, the present application will be further described below in detail with reference to the accompanying drawings and embodiments. It should be understood that the specific embodiments described herein merely serve to explain the present application, and are not intended to limit the present application.

Figure 1:
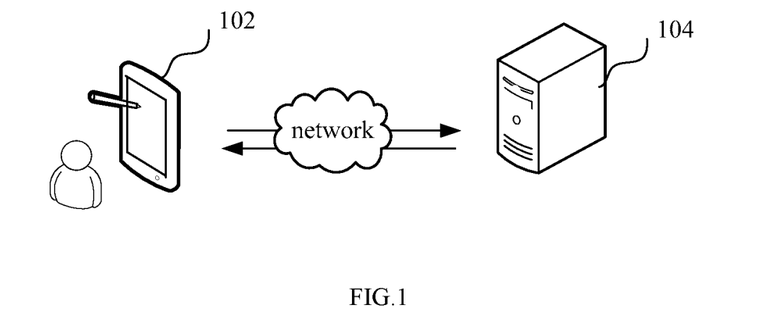
FIG. 1 is an application environment diagram of a search ranking method according to an embodiment.

The search ranking method provided by the present application may be applied to an application environment as shown in FIG. 1. A terminal 102 communicates with a server 104 via a network. Search keywords are entered at the terminal 102, and the server 104 acquires the search keywords and determines a plurality of initial search results that match with the plurality of keywords; text similarity, update time dimension, and objective importance of contacts are extracted according to the initial search results; a weight of the text similarity, a weight of the update time dimension, and a weight of the objective importance of the contacts are acquired according to the text similarity, the update time dimension, and the objective importance of the contacts; a fusion calculation is performed on each of the initial search results according to the weight of the text similarity, the weight of the update time dimension, and the weight of the objective importance of the contacts to obtain a comprehensive weight of each of the initial search results; and the plurality of initial search results are ranked according to the comprehensive weights, and a result of the ranking is displayed in the terminal 102. The terminal 102 may be, but is not limited to, various personal computers, notebook computers, smart phones, tablets, and portable wearable devices. The server 104 may be implemented by an independent server, or a server cluster composed of a plurality of servers.

Figure 2:
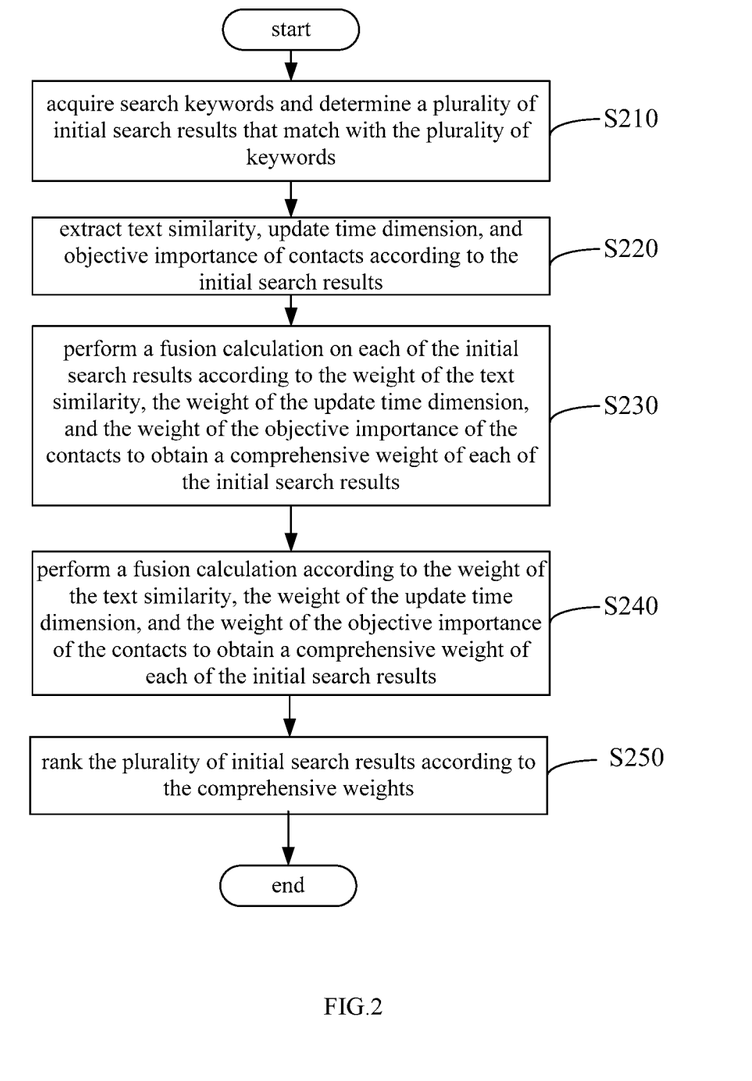
FIG. 2 is a schematic flow chart of a search ranking method according to an embodiment.

In an embodiment, as shown in FIG. 2, a search ranking method is provided, and a description will be given below by using an example in which the method is applied to the server in FIG. 1, wherein the method includes the following steps S210-S250.

S210: acquiring search keywords and determining a plurality of initial search results that match with the plurality of keywords.

The search keywords are input information entered by the user when searching for relevant information using a search engine, such as words, terms, symbols and the like. Columns in this embodiment include a contact column, a group chat column, and a message column.

Specifically, the search keywords are entered at the terminal, and the terminal acquires the search keywords entered by the user and sends them to a server.

Step S220: extracting text similarity, update time dimension, and objective importance of contacts according to the initial search results.

Fields included in each initial search result include: object type, object status, object name, score of initially recalling search engine, chat update time, position of the latest message, Chinese pinyin name of the object, English name of the object, and the department in which the object is located, wherein the object type includes a chat application and a mail, and the object status includes whether the object is registered, and whether the object has resigned.

In a preferred embodiment, before extracting the text similarity, the update time dimension, and the objective importance of the contacts associated with each of the initial search results, the method further includes: screening the initial search results. The screening the initial search results include: not ranking the initial search results of the users who have resigned and have no chat records, and ranking the initial search results of unregistered users at the end. A chat history may be determined by the chat update time or the position corresponding to the latest message.

Step S230: acquiring a weight of the text similarity, a weight of the update time dimension, and a weight of the objective importance of the contacts according to the text similarity, the update time dimension, and the objective importance of the contacts.

Step S240: performing a fusion calculation on each of the initial search results according to the weight of the text similarity, the weight of the update time dimension, and the weight of the objective importance of the contacts to obtain a comprehensive weight of each of the initial search results.

The parameter of text similarity is configured to characterize a matching degree between the search keywords and the search results, the parameter of update time dimension is configured to characterize an update status of chat records of the search results, and the parameter of objective importance of the contacts is configured to characterize the public's evaluation of the search results. The objective importance of the contacts is determined by public evaluation data.

Step S250: ranking the plurality of initial search results according to the comprehensive weights.

The ranking may be performed according to the comprehensive weights in an order from large to small, or may be performed according to the comprehensive weights in an order from small to large. Such a technical solution does not distinguish the ranking manners according to the columns, but performs the ranking according to the weights, so as to quickly find relevant information.

The above-mentioned search ranking method ensures that the ranking is performed according to time by acquiring the weight of the update time dimension, and the ranking is recommended according to the objective importance of the contacts, so that the search results with high public evaluation data are ranked ahead; by ranking the search results according to a plurality of dimensions, the ranking is made intelligent, which facilitates users in quickly finding relevant information, simplifies the operation, and improves the searching efficiency.

Figure 3:
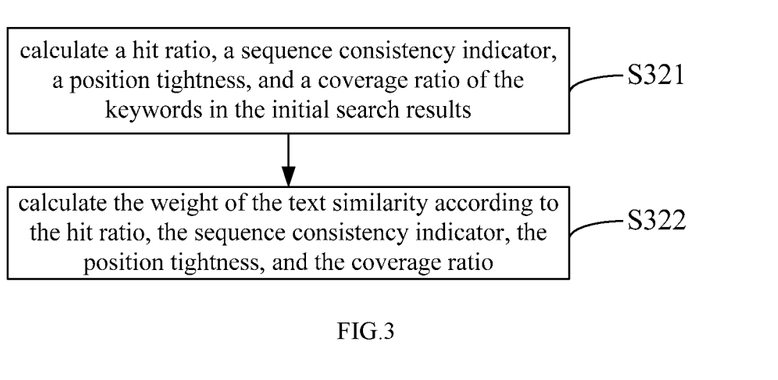
FIG. 3 is a schematic flow chart showing the steps of acquiring a weight of text similarity in an embodiment.

In one of the embodiments, as shown in FIG. 3, the acquiring the weight of the text similarity includes:

S321: calculating a hit ratio, a sequence consistency indicator, a position tightness, and a coverage ratio of the keywords in the initial search results; and S322: calculating the weight of the text similarity according to the hit ratio, the sequence consistency indicator, the position tightness, and the coverage ratio.

In one of the embodiments, the step of calculating the weight of the text similarity according to the hit ratio, the sequence consistency indicator, the position tightness and the coverage ratio includes: acquiring an offset value and a correction value respectively, according to the hit ratio, the sequence consistency indicator, the position tightness, and the coverage ratio; and performing a fusion calculation according to the hit ratio, the sequence consistency indicator, the position tightness, the coverage ratio, the corresponding offset value and the corresponding correction value to obtain the weight of the text similarity. The offset value and the correction value are determined by machine learning. The acquiring the offset value and the correction value respectively according to the hit ratio, the sequence consistency indicator, the position tightness and the coverage ratio includes: acquiring the hit ratio offset value and the hit ratio correction value according to the hit ratio, acquiring the sequence consistency indicator offset value and the sequence consistency indicator correction value according to the sequence consistency indicator, acquiring the position tightness offset value and the position tightness correction value according to the position tightness, and acquiring the coverage ratio offset value and the coverage ratio correction value according to the coverage ratio.

In one of the embodiments, the formula of calculating the weight of the text similarity specifically is:

text_similar=(a*hit+b)*(c*sequence+d)*(e*position+f)* (g*cover+h); wherein text_similar is the weight of the text similarity, hit is the hit ratio of the text, sequence is the sequence consistency indicator, position is the position tightness, and cover is the coverage ratio; a and b are the offset value and the correction value of the hit ratio, c and d are the offset value and the correction value of the sequence consistency indicator, e and f are the offset value and the correction value of the position tightness, and g and h are the offset value and the correction value of the coverage ratio; wherein a larger offset value indicates a higher importance of the item involved. The hit ratio of the text indicates a ratio of the number of hits of the search keywords in the corresponding text document to the total number of search keywords. Obviously, the higher the ratio is, the closer the initial search result is to the search target. The sequence consistency indicator indicates the consistency of the sequence of the search keywords with the sequence of the search keywords appearing in the corresponding text document, and the sequence consistency is expressed by the ratio of the number of reversed sequences. For example, the number of reversed sequences of (1, 2, 3) is 0, which indicates a most sequenced arrangement, and the number of reversed sequences of (3, 2, 1) is 3, which indicates a least sequenced arrangement. The position tightness indicates a ratio obtained by dividing the number of hit text documents by the sum of the number of hit text documents and the number of hit spacers. For example, for the keywords "Zhang San, Zhang Si, Li Si", the hit initial search results are "Zhang San" and "Li Si's group", the hit keywords are "Zhang San, Li Si", the number t of hit text documents is 2, and the number of the hit spacers is 1 (since there is a "Zhang Si" between the hit keywords). Therefore, the position tightness=2/(1+2)=2/3. The coverage ratio indicates a ratio of hit keywords to the total fields of all hit text documents.

Figure 4:
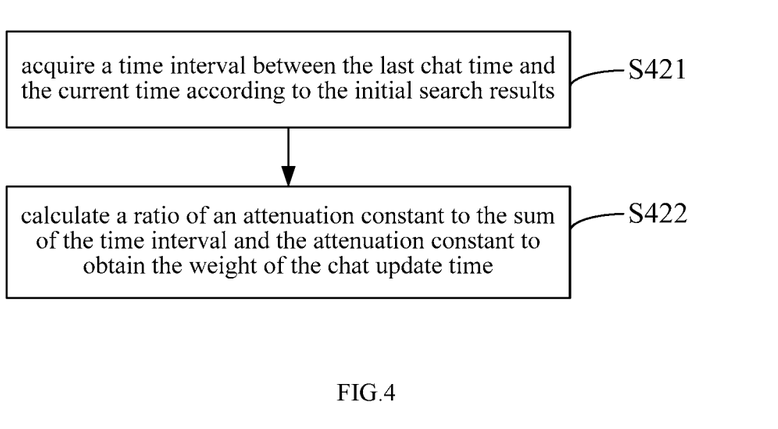
FIG. 4 is a schematic flow chart showing the steps of acquiring a weight of update time dimension in an embodiment.

In one of the embodiments, as shown in FIG. 4, the acquiring the weight of the update time dimension includes:

S421: acquiring a time interval between the last chat time and the current time according to the initial search results; and S422: calculating a ratio of an attenuation constant to the sum of the time interval and the attenuation constant to obtain the weight of the update time dimension.

In one of the embodiments, the formula of calculating the weight of the update time dimension is:

update_time_weight=factor/(factor+ update_time_secs);

wherein update_time_weight is the weight of the update time dimension, factor is a constant which is attenuated over time, and the unit of the factor is second. Herein, the calculation is performed on a basis of attenuating by a half in 30 days, i.e., factor=30*24*3600=2592000. update time secs is the number of seconds till now since the last chat time. For example, if the last chat time is 30 days ago, then update_time_secs=30*24*3600=259200, then the update time dimension update_time_weight=259200/(259200+ 259200)=1/2.

Figure 5:
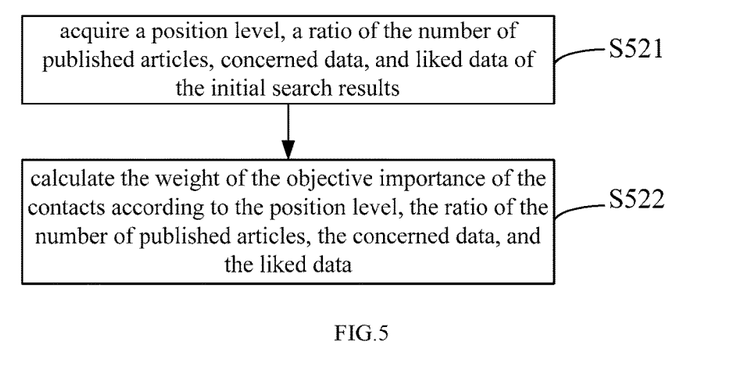
FIG. 5 is a schematic flow chart showing the steps of acquiring a weight of objective importance of contacts in an embodiment.

In one of the embodiments, as shown in FIG. 5, the acquiring the weight of the objective importance of the contacts includes:

S521: acquiring a position level, a ratio of the number of published articles, concerned data, and liked data of the initial search results; and S522: calculating the weight of the objective importance of the contacts according to the position level, the ratio of the number of published articles, the concerned data, and the liked data.

In one of the embodiments, the calculating the weight of the objective importance of the contacts according to the position level, the ratio of the number of published articles, the concerned data, and the liked data includes: acquiring an offset value and a correction value respectively, according to the position level, the ratio of the number of published articles, the concerned data, and the liked data; and performing a fusion calculation according to the position level, the ratio of the number of published articles, the concerned data, the liked data, the corresponding offset value and the corresponding correction value to obtain the weight of the objective importance of the contacts. The offset value and the correction value are determined by machine learning. The acquiring the offset value and the correction value respectively according to the position level, the ratio of the number of published articles, the concerned data, and the liked data includes: acquiring the offset value and the correction value according to the position level; acquiring the offset value and the correction value according to the ratio of the number of published articles; acquiring the offset value and the correction value according to the concerned data; and acquiring the offset value and the correction value according to the liked data.

In one of the embodiments, the formula of calculating the weight of the objective importance of the contacts specifically is:

static_weight=($i$*position+$j$)*($k$*article_num+$l$)* ($m$*concerned_num+$n$)*($o$*liked_num+$p$);

wherein static weight is the weight of the objective importance of the contacts, position is the position level, article num is the ratio of the number of published articles, concerned_num is the concerned data, and liked_num is the liked data; i and j are the offset value and the correction value of the position level, k and l are the offset value and the correction value of the ratio of the number of published articles, m and n are the offset value and the correction value of the concerned data, and o and p are the offset value and the correction value of the liked data; wherein a larger offset value indicates a higher importance of the item involved. The objective importance is a static dimension, which has nothing to do with the user and the search keywords, and is generally the object that most users know and want to find. Under the same other conditions, the more widely known people are more likely to be ranked ahead, and has a higher objective importance. The weight of the objective importance is obtained by offline calculation and is updated once in a cycle (such as calculated once a week).

In one of the embodiments, the performing the fusion calculation according to the weight of the text similarity, the weight of the update time dimension, and the weight of the objective importance of the contacts to obtain the comprehensive weight of each of the initial search results includes: normalizing the weight of the text similarity, the weight of the update time dimension, and the weight of the objective importance of the contacts; and performing the fusion calculation according to the normalized weight of the text similarity, the normalized weight of the update time dimension, and the normalized weight of the objective importance of the contacts to obtain the comprehensive weight of each of the initial search results. Specifically, the weight of the text similarity, the weight of the update time dimension, and the weight of the objective importance of the contacts are normalized to a decimal between 0 and 1.

In one of the embodiments, the performing the fusion calculation according to the weight of the text similarity, the weight of the update time dimension, and the weight of the objective importance of the contacts to obtain the comprehensive weight of each of the initial search results includes: acquiring an offset value and a correction value respectively, according to the weight of the text similarity, the weight of the update time dimension, and the weight of the objective importance of the contacts; obtaining a fusion coefficient by calculating a sum of a product of the weight of the text similarity and the corresponding offset value, and the corresponding correction value; obtaining a fusion coefficient by calculating a sum of a product of the weight of the update time dimension and the corresponding offset value, and the corresponding correction value; obtaining a fusion coefficient by calculating a sum of a product of the objective importance of the contacts and the corresponding offset value, and the corresponding correction value; and multiplying the fusion coefficients to obtain a comprehensive weight of each of the initial search results. The offset value and the correction value are determined by machine learning.

In a specific embodiment, the formula of calculating the comprehensive weight is as follows:

$$weight = (a1*text\_weight + b1) * (a2*update\_time\_weight + b2) * (a3*static\_weight + b3);$$

wherein weight is the weight of the initial search result, text weight is the weight of the text similarity, update_time_weight is the weight of the update time dimension, and static weight is the weight of the objective importance of the contacts. In the formula, each parentheses includes therein a calculation of the fusion coefficient, wherein text weight represents the weight of the text similarity, a1 is the offset value, b1 is the correction value, and a first fusion coefficient is calculated by a1*text_weight+b1; update_time_weight represents the weight of the update time dimension, a2 is the offset value, b2 is the correction value, and a second fusion coefficient is calculated by a2*update_time_weight+b2; and a plurality of fusion coefficients are multiplied to obtain the comprehensive weight of the initial search result. In the formula, each of a1, a2 and a3 is an offset value, and each of b1, b2 and b3 is a correction value. The objective importance of the contacts is a static dimension, which has nothing to do with the search subject and the search keywords, and is generally the object that most users want to find. Under the same other conditions, the more widely known people are more likely to be ranked ahead, and has a higher objective importance. This method enables the system to recommend based on public evaluation data of the search results.

In an enterprise communication tool, by ranking the search results according the magnitudes of the weights thereof as in the embodiment of the present disclosure, the ranking is no longer merely limited to a single time-based ranking. For various types of search objects such as contacts and group chats, a mixed ranking can be performed so that the most desired search results are presented to the users, thereby improving the efficiency of enterprise communication.

It should be understood that although the various steps in the flow charts of FIGS. 2-5 are sequentially displayed as indicated by the arrows, these steps do not necessarily have to be sequentially executed in the order indicated by the arrows. Unless explicitly stated herein, the execution of these steps is not strictly limited by any order, and they may be executed in other orders. Moreover, at least some of the steps in FIGS. 2-5 may include a plurality of sub-steps or stages, which are not necessarily executed or completed at the same time instants, but may be executed at different time instants. These sub-steps or stages are not necessarily executed sequentially, but may be executed alternately with at least a portion of other steps or at least a portion of sub-steps or stages of other steps.

Figure 6:
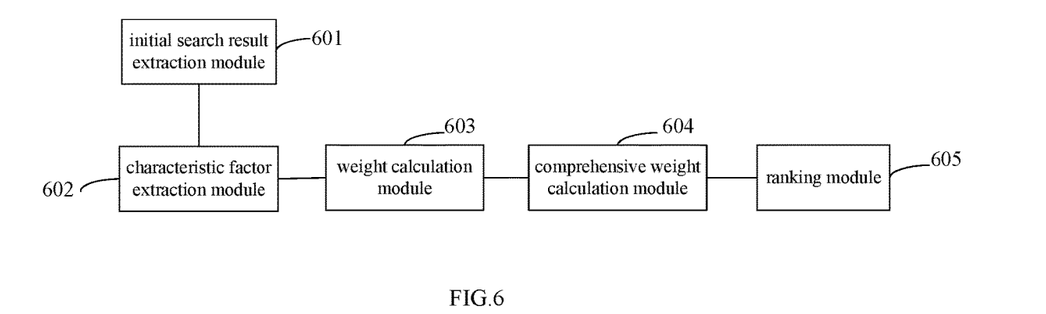
FIG. 6 is a structural block diagram of a search ranking apparatus according to an embodiment.

In one embodiment, as shown in FIG. 6, a search ranking apparatus is provided, which includes: an initial search result extraction module 601, a characteristic factor extraction module 602, a weight calculation module 603, a comprehensive weight calculation module 604, and a ranking module 605.

The initial search result extraction module 601 is configured to acquire search keywords and determine a plurality of initial search results that match with the plurality of keywords.

The search keywords are input information entered by the user when searching for relevant information using a search engine, such as words, terms, symbols and the like. Columns in this embodiment include a contact column, a group chat column, and a message column.

Specifically, the search keywords are entered at the terminal, and the terminal acquires the search keywords entered by the user and sends them to a server.

The characteristic factor extraction module 602 is configured to extract text similarity, update time dimension, and objective importance of contacts according to the initial search results.

Fields included in each initial search result include: object type, object status, object name, score of initially recalling search engine, chat update time, position of the latest message, Chinese pinyin name of the object, English name of the object, and the department in which the object is located, wherein the object type includes a chat application and a mail, and the object status includes whether the object is registered, and whether the object has resigned.

In a preferred embodiment, the search ranking apparatus further includes: a screening module which is configured to screen the initial search results. The screening the initial search results include: not ranking the initial search results of the users who have resigned and have no chat records, and ranking the initial search results of unregistered users at the end. A chat history may be determined by the chat update time or the position corresponding to the latest message The weight calculation module 603 is configured to acquire a weight of the text similarity, a weight of the update time dimension, and a weight of the objective importance of the contacts according to the text similarity, the update time dimension, and the objective importance of the contacts.

The comprehensive weight calculation module 604 is configured to perform a fusion calculation on each of the initial search results according to the weight of the text similarity, the weight of the update time dimension, and the weight of the objective importance of the contacts to obtain a comprehensive weight of each of the initial search results.

The parameter of text similarity is configured to characterize a matching degree between the search keywords and the search results, the parameter of update time dimension is configured to characterize an update status of chat records of the search results, and the parameter of objective importance of the contacts is configured to characterize the public's evaluation of the search results. The objective importance of the contacts is determined by public evaluation data.

The ranking module 605 is configured to rank the plurality of initial search results according to the comprehensive weights.

The ranking may be performed according to the comprehensive weights in an order from large to small, or may be performed according to the comprehensive weights in an order from small to large. Such a technical solution does not distinguish the ranking manners according to the columns, but performs the ranking according to the weights, so as to quickly find relevant information.

Figure 7:
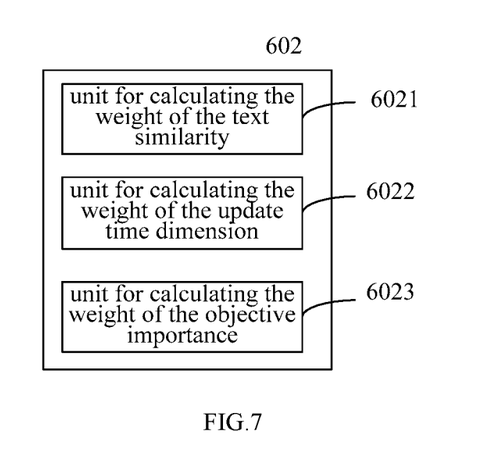
FIG. 7 is a structural block diagram of a characteristic factor extraction module in an embodiment.

In one embodiment, as shown in FIG. 7, the characteristic factor extraction module 602 includes a unit 6021 for calculating the weight of the text similarity, a unit 6022 for calculating the weight of the update time dimension, and a unit 6023 for calculating the weight of the objective importance.

The unit 6021 for calculating the weight of the text similarity is configured to calculate a hit ratio, a sequence consistency indicator, a position tightness, and a coverage ratio of the keywords in the initial search results, and calculate the weight of the text similarity according to the hit ratio, the sequence consistency indicator, the position tightness, and the coverage ratio.

In one embodiment, the unit for calculating the weight of the text similarity includes: a first sub-unit for acquiring offset value and correction value, configured to acquire an offset value and a correction value respectively, according to the hit ratio, the sequence consistency indicator, the position tightness, and the coverage ratio; and a sub-unit for fusion-calculating the text similarity, configured to perform a fusion calculation according to the hit ratio, the sequence consistency indicator, the position tightness, the coverage ratio, the offset value and the correction value to obtain the weight of the text similarity. The offset value and the correction value are determined by machine learning. The acquiring the offset value and the correction value respectively according to the hit ratio, the sequence consistency indicator, the position tightness and the coverage ratio includes: acquiring the offset value and the correction value according to the hit ratio, acquiring the offset value and the correction value according to the sequence consistency indicator, acquiring the offset value and the correction value according to the position tightness, and acquiring the offset value and the correction value according to the coverage ratio.

In one of the embodiments, the formula of calculating the weight of the text similarity specifically is:

$$\text{text\_similar}=(a*\text{hit}+b)*(c*\text{sequence}+d)*(e*\text{position}+f)*(g*\text{cover}+h);$$

wherein text_similar is the weight of the text similarity, hit is the hit ratio of the text, sequence is the sequence consistency indicator, position is the position tightness, and cover is the coverage ratio; a and b are the offset value and the correction value of the hit ratio, c and d are the offset value and the correction value of the sequence consistency indicator, e and f are the offset value and the correction value of the position tightness, and g and h are the offset value and the correction value of the coverage ratio; wherein a larger offset value indicates a higher importance of the item involved. The hit ratio of the text indicates a ratio of the number of hits of the search keywords in the corresponding text document to the total number of search keywords. Obviously, the higher the ratio is, the closer the initial search result is to the search target. The sequence consistency indicator indicates the consistency of the sequence of the search keywords with the sequence of the search keywords appearing in the corresponding text document, and the sequence consistency is expressed by the ratio of the number of reversed sequences. For example, the number of reversed sequences of (1, 2, 3) is 0, which indicates a most sequenced arrangement, and the number of reversed sequences of (3, 2, 1) is 3, which indicates a least sequenced arrangement. The position tightness indicates a ratio of the number of hit text documents to the sum of the number of hit text documents and the number of hit spacers. For example, for the keywords "Zhang San, Zhang Si, Li Si", the hit initial search results are "Zhang San" and "Li Si's group", the hit keywords are "Zhang San, Li Si", the number t of hit text documents is 2, and the number of the hit spacers is 1 (since there is a "Zhang Si" between the hit keywords). Therefore, the position tightness=2/(1+2)=2/3. The coverage ratio indicates a ratio of hit keywords to the total fields of all hit text documents.

The unit 6022 for calculating the weight of the update time dimension is configured to acquire a time interval between the last chat time and the current time according to the initial search results, and calculate a ratio of an attenuation constant to the sum of the time interval and the attenuation constant to obtain the weight of the update time dimension.

In one of the embodiments, the formula of calculating the weight of the update time dimension is:

$$\text{update\_time\_weight}=\text{factor}/(\text{factor}+\text{update\_time\_secs});$$

wherein update_time_weight is the weight of the update time dimension, factor is a constant which is attenuated over time, and the unit of the factor is second. Herein, the calculation is performed on a basis of attenuating by a half in 30 days, i.e., factor=30*24*3600=2592000. update_time_secs is the number of seconds till now since the last chat time. For example, if the last chat time is 30 days ago, then update_time_secs=30*24*3600=259200, then the update time dimension update_time_weight=259200/(259200+259200)=112.

The unit 6023 for calculating the weight of the objective importance is configured to acquire a position level, a ratio of the number of published articles, concerned data, and liked data of the initial search results, and calculate the weight of the objective importance of the contacts according to the position level, the ratio of the number of published articles, the concerned data, and the liked data.

In one of the embodiments, the unit 6023 for calculating the weight of the objective importance includes: a second sub-unit for acquiring offset value and correction value, configured to acquire an offset value and a correction value respectively, according to the position level, the ratio of the number of published articles, the concerned data, and the liked data; and a sub-unit for fusion-calculating the objective importance, configured to perform a fusion calculation according to the position level, the ratio of the number of published articles, the concerned data, the liked data, the corresponding offset value and the corresponding correction value to obtain the weight of the objective importance of the contacts. The offset value and the correction value are determined by machine learning. The acquiring the offset value and the correction value respectively according to the position level, the ratio of the number of published articles, the concerned data, and the liked data includes: acquiring the offset value and the correction value according to the position level; acquiring the offset value and the correction value according to the ratio of the number of published articles; acquiring the offset value and the correction value according to the concerned data; and acquiring the offset value and the correction value according to the liked data.

In one of the embodiments, the formula of calculating the weight of the objective importance of the contacts specifically is:

$$\text{static\_weight}=(i*\text{position}+j)*(k*\text{article\_num}+l)*(m*\text{concerned num}+n)*(o*\text{liked num}+p);$$

wherein static_weight is the weight of the objective importance of the contacts, position is the position level, article_num is the ratio of the number of published articles, concerned_num is the concerned data, and liked_num is the liked data; i and j are the offset value and the correction value of the position level, k and l are the offset value and the correction value of the ratio of the number of published articles, m and n are the offset value and the correction value of the concerned data, and o and p are the offset value and the correction value of the liked data; wherein a larger offset value indicates a higher importance of the item involved. The objective importance is a static dimension, which has nothing to do with the user and the search keywords, and is generally the object that most users know and want to find. Under the same other conditions, the more widely known people are more likely to be ranked ahead, and has a higher objective importance. The weight of the objective importance is obtained by offline calculation and is updated once in a cycle (such as calculated once a week).

Figure 8:
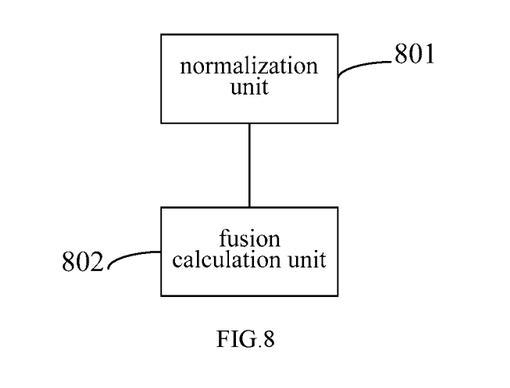
FIG. 8 is a structural block diagram of a comprehensive weight calculation module in an embodiment.

In one of the embodiments, as shown in FIG. 8, the weight calculation module includes a normalization unit 801 and a fusion calculation unit 802.

The normalization unit 801 is configured to normalize the weight of the text similarity, the weight of the update time dimension, and the weight of the objective importance of the contacts.

The weight of the text similarity, the weight of the update time dimension, and the weight of the objective importance of the contacts are normalized to a decimal between 0 and 1.

The fusion calculation unit 802 is configured to perform the fusion calculation according to the normalized weight of the text similarity, the normalized weight of the update time dimension, and the normalized weight of the objective importance of the contacts to obtain the comprehensive weight of each of the initial search results.

In one of the embodiments, the comprehensive weight calculation module includes: a third sub-unit for acquiring offset value and a correction value, configured to acquire an offset value and a correction value respectively, according to the weight of the text similarity, the weight of the update time dimension, and the weight of the objective importance of the contacts; a fusion coefficient calculation unit, configured to obtain a fusion coefficient by calculating a sum of a product of the weight of the text similarity and the corresponding offset value, and the corresponding correction value, to obtain a fusion coefficient by calculating a sum of a product of the weight of the update time dimension and the corresponding offset value, and the corresponding correction value, and to obtain a fusion coefficient by calculating a sum of a product of the objective importance of the contacts and the corresponding offset value, and the corresponding correction value; and a comprehensive weight calculation unit, configured to multiply the fusion coefficients to obtain a comprehensive weight of each of the initial search results.

In a specific embodiment, the formula of calculating the comprehensive weight is as follows:

$$\text{weight}=(a1*\text{text\_weight}+b1)*(a2*\text{update\_time\_weight}+b2)*(a3*\text{static\_weight}+b3);$$

wherein weight is the weight of the initial search results, text weight is the weight of the text similarity, update_time_weight is the weight of the update time dimension, and static_weight is the weight of the objective importance of the contacts. In the formula, each parentheses includes therein a calculation of the fusion coefficient, wherein text weight represents the weight of the text similarity, a1 is the offset value, b1 is the correction value, and a first fusion coefficient is calculated by a1*text_weight+b1; update_time_weight represents the weight of the update time dimension, a2 is the offset value, b2 is the correction value, and a second fusion coefficient is calculated by a2*update_time_weight+b2; and a plurality of fusion coefficients are multiplied to obtain the comprehensive weight of the initial search result. In the formula, each of a1, a2 and a3 is an offset value, and each of b1, b2 and b3 is a correction value. The objective importance of the contacts is a static dimension, which has nothing to do with the search subject and the search keywords, and is generally the object that most users want to find. Under the same other conditions, the more widely known people are more likely to be ranked ahead, and has a higher objective importance. This method enables the system to recommend based on public evaluation data of the search results.

In an enterprise communication tool, by ranking the search results according the magnitudes of the weights thereof as in the embodiment of the present disclosure, the ranking is no longer merely limited to a single time-based ranking. For various types of search objects such as contacts and group chats, a mixed ranking can be performed so that the most desired search results are presented to the users, thereby improving the efficiency of enterprise communication.

For the specific definition of the search ranking apparatus, reference may be made to the above definition of the search ranking method, and details are not described herein again. The various modules in the above search ranking apparatus may be implemented entirely or partially by software, hardware, and a combination thereof. Each of the above modules may be embedded in or independent from a processor of an electronic device in a form of hardware, or may be stored in a memory of an electronic device in a form of software so as to be called by the processor to perform operations corresponding to the above various modules.

In one embodiment, an electronic device is provided, which includes a memory having a computer program stored thereon, and a processor, wherein when the computer program is executed by the processor, the following steps are implemented:

acquiring search keywords and determining a plurality of initial search results that match with the plurality of keywords;

extracting text similarity, update time dimension, and objective importance of contacts according to the initial search results;

acquiring a weight of the text similarity, a weight of the update time dimension, and a weight of the objective importance of the contacts according to the text similarity, the update time dimension, and the objective importance of the contacts;

performing a fusion calculation on each of the initial search results according to the weight of the text similarity, the weight of the update time dimension, and the weight of the objective importance of the contacts to obtain a comprehensive weight of each of the initial search results; and ranking the plurality of initial search results according to the comprehensive weights.

In one embodiment, an electronic device is provided. Hereinafter, reference is made to FIG. 9, in which a schematic structural diagram of an electronic device suitable for implementing the embodiments of the present application is shown. The electronic device in the embodiment of the present application may include, but is not limited to, mobile terminals such as a mobile phone, a notebook computer, a digital broadcast receiver, a Personal Digital Assistant (PDA), a Tablet (PAD), a Portable Multimedia Player (PMP), an in-vehicle terminal (such as an in-vehicle navigation terminal), and fixed terminals such as a digital TV, a desktop computer or the like. The electronic device shown in FIG. 9 is merely an example, and should not impose any limitation on the function and scope of use of the embodiments of the present application.

Figure 9:
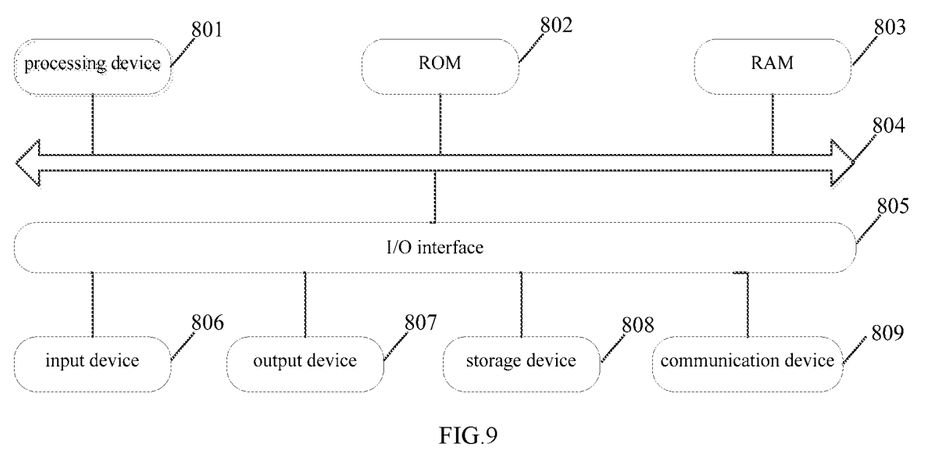
FIG. 9 is an internal structural diagram of an electronic device according to an embodiment.

As shown in FIG. 9, an electronic device 800 may include a processing device (e.g., a central processor, a graphic processor, etc.) 801 that may perform various appropriate actions and processes based on programs stored in a read only memory (ROM) 802 or programs loaded into a random access memory (RAM) 803 from a storage device 808. In the RAM 803, various programs and data required for the operations of the electronic device 800 are also stored. The processing device 801, the ROM 802, and the RAM 803 are connected to each other via a bus 804. An input/output (I/O) interface 805 is also connected to the bus 804.

In general, the following devices may be connected to the I/O interface 805: an input device 806 including, for example, a touch screen, a touch pad, a keyboard, a mouse, a camera, a microphone, an accelerometer, a gyroscope or the like; an output device 807 including, for example, a liquid crystal display (LCD), a speaker, a vibrator or the like; a storage device 808 including, for example, a magnetic tape, a hard disk or the like; and a communication device 809. The communication device 809 may allow the electronic device 800 to communicate with other devices in a wireless or wired manner to exchange data. Although FIG. 9 illustrates that the electronic device 800 is provided with various devices, it should be understood that it is not required to implement or have all of the illustrated devices. Alternatively, more or fewer devices may be implemented or provided.

In particular, according to the embodiments of the present application, the processes described above with reference to the flow charts may be implemented as a computer software program. For example, an embodiment of the present application includes a computer program product having a computer program embodied on a computer readable medium, and the computer program includes program codes for execution of the methods illustrated in the flow charts. In such an embodiment, the computer program may be downloaded from the network via the communication device 809 and installed, or installed from the storage device 808, or installed from the ROM 802. When the computer program is executed by the processing device 801, the above-described functions defined in the method of the embodiment of the present application are executed.

In particular, according to the embodiments of the present application, the processes described above with reference to the flow charts may be implemented as a computer software program. For example, an embodiment of the present application includes a computer program product having a computer program embodied on a computer readable medium, and the computer program includes program codes for execution of the methods illustrated in the flow charts. In such an embodiment, the computer program may be downloaded from the network via the communication device 809 and installed, or installed from the storage device 808, or installed from the ROM 802. When the computer program is executed by the processing device 801, the above-described functions defined in the method of the embodiment of the present application are executed.

It should be noted that the computer readable medium described above may be a computer readable signal medium or a computer readable storage medium or any combination of the two. The computer readable storage medium may be, for example, but is not limited to, electronic, magnetic, optical, electromagnetic, infrared, or semiconductor systems, apparatuses, or devices, or any combination of them. More specific examples of the computer readable storage medium may include, but are not limited to, electrical connections having one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of them. In the present application, the computer readable storage medium may be any tangible medium that contains or stores a program which may be used by or in combination with an instruction execution system, apparatus or device. In the present application, the computer readable signal medium may include a data signal that is propagated in a baseband or as part of a carrier, and computer readable program codes are carried in the data signal. Such propagated data signal may take a variety of forms including, but not limited to, electromagnetic signals, optical signals, or any suitable combination of them. The computer readable signal medium may also be any computer readable medium other than the computer readable storage medium, and may send, propagate or transmit a program for use by or in combination with an instruction execution system, apparatus or device. The program code contained on the computer readable medium may be transmitted by any suitable medium, including but not limited to: wire, fiber optic cable, radio frequency (RF) and the like, or any suitable combination of them.

The computer readable medium described above may be included in the above electronic device; or may exist separately and is not incorporated in the electronic device.

The computer readable medium carries one or more programs, and when the one or more programs are executed by the electronic device, the electronic device: acquiring search keywords and determining a plurality of initial search results that match with the plurality of keywords; extracting text similarity, update time dimension, and objective importance of contacts according to the initial search results; acquiring a weight of the text similarity, a weight of the update time dimension, and a weight of the objective importance of the contacts according to the text similarity, the update time dimension, and the objective importance of the contacts; performing a fusion calculation on each of the initial search results according to the weight of the text similarity, the weight of the update time dimension, and the weight of the objective importance of the contacts to obtain a comprehensive weight of each of the initial search results; ranking the plurality of initial search results according to the comprehensive weights.

The computer program code for execution of the operations of the present application may be written in one or more programming languages, or combinations thereof, including an object-oriented programming language such as Java, Smalltalk and C++, and conventional procedural programming languages such as the "C" language or a similar programming language. The program code may be executed entirely on the user's computer, partly on the user's computer, as a stand-alone software package, partly on the user's computer and partly on a remote computer, or entirely on a remote computer or server. In the case of a remote computer, the remote computer may be connected to the user's computer via any kind of network, including a local area network (LAN) or a wide area network (WAN), or may be connected to an external computer (e.g., using Internet connection via Internet service provider).

The flow charts and block diagrams in the drawings illustrate the architectures, functions and operations of possible implementations of the systems, methods and computer program products according to various embodiments of the present application. In this regard, each block of the flow charts or block diagrams may represent a module, a program segment, or a portion of code that includes one or more executable instructions for implementing specified logic functions. It should also be noted that in some alternative implementations, the functions marked in the blocks may also occur in a different order than that illustrated in the drawings. For example, two successively represented blocks may actually be executed substantially in parallel, and they may sometimes be executed in a reversed order, depending on the functions involved. It is also noted that each block of the block diagrams and/or flow charts, and combinations of blocks in the block diagrams and/or flow charts, may be implemented in a dedicated hardware-based system that performs a specified function or operation, or it can be implemented by a combination of dedicated hardware and computer instructions.

The modules involved in the embodiments of the present application may be implemented by software or by hardware. The name of the module does not limit the module itself in some cases. For example, an initial search result extraction module may also be described as "a module for acquiring search keywords and determining a plurality of initial search results that match with the plurality of keywords".

In one embodiment, a computer readable storage medium is provided, which has a computer program stored thereon, wherein when the computer program is executed by a processor, the following steps are implemented:

acquiring search keywords and determining a plurality of initial search results that match with the plurality of keywords;

extracting text similarity, update time dimension, and objective importance of contacts according to the initial search results;

acquiring a weight of the text similarity, a weight of the update time dimension, and a weight of the objective importance of the contacts according to the text similarity, the update time dimension, and the objective importance of the contacts;

performing a fusion calculation on each of the initial search results according to the weight of the text similarity, the weight of the update time dimension, and the weight of the objective importance of the contacts to obtain a comprehensive weight of each of the initial search results; and ranking the plurality of initial search results according to the comprehensive weights.

Through the description of the above embodiments, those skilled in the art can clearly understand that the various embodiments may be implemented by means of software and a necessary general hardware platform, and may of course also be implemented by hardware. Based on such understanding, an essential part of the above technical solutions or the part that makes contribution to the prior art, may be embodied in the form of software products which may be stored in non-transitory storage media, such as magnetic disks, optical disks, read only memory (ROM) or random access memory (RAM), etc., and it includes several instructions for causing an electronic device (which may be a personal computer, a server, or a network device, etc.) to perform the methods described in various embodiments or in some portions of the embodiments.

The technical features of the above embodiments may be arbitrarily combined. For the sake of brevity of description, not all possible combinations of the technical features in the above embodiments are described. However, as long as there is no contradiction in the combination of these technical features, it should be considered as falling within the scope described in this specification.

The above described embodiments are merely illustrative of several implementations of the present application, and the description thereof is more specific and detailed, but it is not to be construed as limiting the scope of the present application. It should be noted that several variations and modifications may also be made by those skilled in the art without departing from the spirit and scope of the present application, and all these variations and modifications will fall within the scope of protection of the present application. Therefore, the scope of protection of the present application should be determined by the appended claims.

What is claimed is:

1. A search ranking method, comprising:

acquiring search keywords and determining a plurality of initial search results that match with the plurality of keywords;

extracting text similarity, update time dimension, and objective importance of contacts according to the initial search results;

acquiring a weight of the text similarity, a weight of the update time dimension, and a weight of the objective importance of the contacts according to the text similarity, the update time dimension, and the objective importance of the contacts;

performing a fusion calculation on each of the initial search results according to the weight of the text similarity, the weight of the update time dimension, and the weight of the objective importance of the contacts to obtain a comprehensive weight of each of the initial search results, wherein the performing the fusion calculation according to the weight of the text similarity, the weight of the update time dimension, and the weight of the objective importance of the contacts to obtain the comprehensive weight of each of the initial search results further comprises:
  normalizing the weight of the text similarity, the weight of the update time dimension, and the weight of the objective importance of the contacts, and
  performing the fusion calculation according to the normalized weight of the text similarity, the normalized weight of the update time dimension, and the normalized weight of the objective importance of the contacts to obtain the comprehensive weight of each of the initial search results; and
  ranking the plurality of initial search results according to the comprehensive weights.

2. The method according to claim 1, wherein the acquiring the weight of the text similarity comprises:
  calculating a hit ratio, a sequence consistency indicator, a position tightness, and a coverage ratio of the keywords in the initial search results; and
  calculating the weight of the text similarity according to the hit ratio, the sequence consistency indicator, the position tightness, and the coverage ratio.

3. The method according to claim 2, wherein the step of calculating the weight of the text similarity according to the hit ratio, the sequence consistency indicator, the position tightness and the coverage ratio comprises:
  acquiring an offset value and a correction value respectively, according to the hit ratio, the sequence consistency indicator, the position tightness, and the coverage ratio; and
  performing a fusion calculation according to the hit ratio, the sequence consistency indicator, the position tightness, the coverage ratio, the corresponding offset value and the corresponding correction value to obtain the weight of the text similarity.

4. The method according to claim 1, wherein the acquiring the weight of the update time dimension comprises:
  acquiring a time interval between the last chat time and the current time according to the initial search results; and
  calculating a ratio of an attenuation constant to the sum of the time interval and the attenuation constant to obtain the weight of the update time dimension.

5. The method according to claim 1, wherein the acquiring the weight of the objective importance of the contacts comprises:
  acquiring a position level, a ratio of the number of published articles, concerned data, and liked data of the initial search results; and
  calculating the weight of the objective importance of the contacts according to the position level, the ratio of the number of published articles, the concerned data, and the liked data.

6. The method according to claim 5, wherein the calculating the weight of the objective importance of the contacts according to the position level, the ratio of the number of published articles, the concerned data, and the liked data comprises:
  acquiring an offset value and a correction value respectively, according to the position level, the ratio of the number of published articles, the concerned data, and the liked data; and
  performing a fusion calculation according to the position level, the ratio of the number of published articles, the concerned data, the liked data, the corresponding offset value and the corresponding correction value to obtain the weight of the objective importance of the contacts.

7. The method according to claim 1, wherein the performing the fusion calculation according to the weight of the text similarity, the weight of the update time dimension, and the weight of the objective importance of the contacts to obtain the comprehensive weight of each of the initial search results comprises:
  acquiring an offset value and a correction value respectively, according to the weight of the text similarity, the weight of the update time dimension, and the weight of the objective importance of the contacts;
  obtaining a fusion coefficient by calculating a sum of a product of the weight of the text similarity and the corresponding offset value, and the corresponding correction value;
  obtaining a fusion coefficient by calculating a sum of a product of the weight of the update time dimension and the corresponding offset value, and the corresponding correction value;
  obtaining a fusion coefficient by calculating a sum of a product of the objective importance of the contacts and the corresponding offset value, and the corresponding correction value; and
  multiplying the fusion coefficients to obtain a comprehensive weight of each of the initial search results.

8. The method according to claim 1, wherein before extracting the text similarity, the update time dimension, and the objective importance of the contacts associated with each of the initial search results, the method further comprises:
  screening the initial search results, which comprises:
  not ranking the initial search results of the users who have resigned and have no chat records; and
  ranking the initial search results of unregistered users at the end.

9. A search ranking apparatus, comprising:
  a memory having a computer program stored thereon; and
  a processor, wherein when the computer program is executed by the processor, causes the apparatus to perform operations comprising:
  acquiring search keywords and determining a plurality of initial search results that match with the plurality of keywords;
  extracting text similarity, update time dimension, and objective importance of contacts associated with each of the initial search results;
  acquiring a weight of the text similarity, a weight of the update time dimension, and a weight of the objective importance of the contacts according to the text similarity, the update time dimension, and the objective importance of the contacts;
  performing a fusion calculation according to the weight of the text similarity, the weight of the update time dimension, and the weight of the objective importance of the contacts to obtain a comprehensive weight of each of the initial search results, wherein the performing the fusion calculation according to the weight of the text similarity, the weight of the update time dimension, and the weight of the objective importance of the contacts to obtain the comprehensive weight of each of the initial search results further comprises:

normalizing the weight of the text similarity, the weight of the update time dimension, and the weight of the objective importance of the contacts, and performing the fusion calculation according to the normalized weight of the text similarity, the normalized weight of the update time dimension, and the normalized weight of the objective importance of the contacts to obtain the comprehensive weight of each of the initial search results; and ranking the plurality of initial search results according to the comprehensive weights.

10. The search ranking apparatus according to claim 9, the operations further comprising:

calculating a hit ratio, a sequence consistency indicator, a position tightness, and a coverage ratio of the keywords in the initial search results; and calculating the weight of the text similarity according to the hit ratio, the sequence consistency indicator, the position tightness, and the coverage ratio.

11. The search ranking apparatus according to claim 10, the operations further comprising:

acquiring an offset value and a correction value respectively, according to the hit ratio, the sequence consistency indicator, the position tightness, and the coverage ratio; and performing a fusion calculation according to the hit ratio, the sequence consistency indicator, the position tightness, the coverage ratio, the corresponding offset value and the corresponding correction value to obtain the weight of the text similarity.

12. The search ranking apparatus according to claim 9, the operations further comprising:

acquiring a time interval between the last chat time and the current time according to the initial search results; and calculating a ratio of an attenuation constant to the sum of the time interval and the attenuation constant to obtain the weight of the update time dimension.

13. The search ranking apparatus according to claim 9, the operations further comprising:

acquiring a position level, a ratio of the number of published articles, concerned data, and liked data of the initial search results; and calculating the weight of the objective importance of the contacts according to the position level, the ratio of the number of published articles, the concerned data, and the liked data.

14. The search ranking apparatus according to claim 13, the operations further comprising:

acquiring an offset value and a correction value respectively, according to the position level, the ratio of the number of published articles, the concerned data, and the liked data; and performing a fusion calculation according to the position level, the ratio of the number of published articles, the concerned data, the liked data, the corresponding offset value and the corresponding correction value to obtain the weight at the objective importance of the contacts.

15. The search ranking apparatus according to claim 9, the operations further comprising:

acquiring an offset value and a correction value respectively, according to the weight of the text similarity, the weight of the update time dimension, and the weight of the objective importance of the contacts;

obtaining a fusion coefficient by calculating a sum of a product of the weight of the text similarity and the corresponding offset value, and the corresponding correction value; obtaining a fusion coefficient by calculating a sum of a product of the weight of the update time dimension and the corresponding offset value, and the corresponding correction value;

obtaining a fusion coefficient by calculating a sum of a product of the objective importance of the contacts and the corresponding offset value, and the corresponding correction value; and multiplying the fusion coefficients to obtain a comprehensive weight of each of the initial search results.

16. The search ranking apparatus according to claim 9, the operations further comprising: screening the initial search results, which comprises:

not ranking the initial search results of the users who have resigned and have no chat records; and ranking the initial search results of unregistered users at the end.

17. A non-transitory computer readable storage medium, which has a computer program stored thereon, wherein when the computer program is executed by a processor, the computer program causes the processor to perform operations comprising:

acquiring search keywords and determining a plurality of initial search results that match with the plurality of keywords;

extracting text similarity, update time dimension, and objective importance of contacts according to the initial search results;

acquiring a weight of the text similarity, a weight of the update time dimension, and a weight of the objective importance of the contacts according to the text similarity, the update time dimension, and the objective importance of the contacts;

performing a fusion calculation on each of the initial search results according to the weight of the text similarity, the weight of the update time dimension, and the weight of the objective importance of the contacts to obtain a comprehensive weight of each of the initial search results, wherein the performing the fusion calculation according to the weight of the text similarity, the weight of the update time dimension, and the weight of the objective importance of the contacts to obtain the comprehensive weight of each of the initial search results further comprises:

normalizing the weight of the text similarity, the weight of the update time dimension, and the weight of the objective importance of the contacts, and performing the fusion calculation according to the normalized weight of the text similarity, the normalized weight of the update time dimension, and the normalized weight of the objective importance of the contacts to obtain the comprehensive weight of each of the initial search results; and ranking the plurality of initial search results according to the comprehensive weights.

18. The non-transitory computer readable storage medium of claim 17, the operations further comprising:

acquiring a time interval between the last chat time and the current time according to the initial search results; and calculating a ratio of an attenuation constant to the sum of the time interval and the attenuation constant to obtain the weight of the update time dimension.

19. The non-transitory computer readable storage medium of claim 17, wherein the performing the fusion calculation according to the weight of the text similarity, the weight of the update time dimension, and the weight of the objective importance of the contacts to obtain the comprehensive weight of each of the initial search results further comprises:

acquiring an offset value and a correction value respectively, according to the weight of the text similarity, the weight of the update time dimension, and the weight of the objective importance of the contacts;

obtaining a fusion coefficient by calculating a sum of a product of the weight of the text similarity and the corresponding offset value, and the corresponding correction value;

obtaining a fusion coefficient by calculating a sum of a product of the weight of the update time dimension and the corresponding offset value, and the corresponding correction value;

obtaining a fusion coefficient by calculating a sum of a product of the objective importance of the contacts and the corresponding offset value, and the corresponding correction value; and     multiplying the fusion coefficients to obtain a comprehensive weight of each of the initial search results.

20. The non-transitory computer readable storage medium of claim 17, the operations further comprising:

screening the initial search results, which comprises:

not ranking the initial search results of the users who have resigned and have no chat records; and     ranking the initial search results of unregistered users at the end.

\* \* \* \* \*